(12) United States Patent
Aschauer (10) Patent No.: US 10,173,838 B2
(45) Date of Patent: Jan. 8, 2019

(54) LOAD-RECEIVING DEVICE (71) Applicant: Swisslog Evomatic GmbH, Sipbachzell (AT)

(72) Inventor: Herbert Aschauer, Wels (AT)

(73) Assignee: Swisslog Evomatic GmbH, Sipbachzell (AT)

( * ) Notice: Subject to any disclaimer, the term of this patent is extended or adjusted under 35 U.S.C. 154(b) by 0 days.

(21) Appl. No.: 15/535,126

(22) PCT Filed: Dec. 10, 2015

(86) PCT No.: PCT/EP2015/079256
§ 371 (c)(1),
(2) Date: Jun. 12, 2017

(87) PCT Pub. No.: WO2016/092019
PCT Pub. Date: Jun. 16, 2016

(65) Prior Publication Data
US 2017/0341862 A1    Nov. 30, 2017

(30) Foreign Application Priority Data

Dec. 10, 2014 (AT) .................................. A 889/2014
Dec. 10, 2014 (AT) .................................. A 890/2014

(51) Int. Cl.
*B65G 1/04* (2006.01)
*B66F 9/07* (2006.01)
(52) U.S. Cl.
CPC ......... *B65G 1/0435* (2013.01); *B65G 1/0492* (2013.01); *B66F 9/07* (2013.01);
(Continued)
(58) Field of Classification Search
CPC ................................................. B65G 1/0435
See application file for complete search history.

(56) References Cited

U.S. PATENT DOCUMENTS

| 4,065,006 A * | 12/1977 | Barry .................... B61B 1/005 104/18 |
| 2006/0245862 A1* | 11/2006 | Hansl .................. B65G 1/0435 414/281 |

(Continued)

FOREIGN PATENT DOCUMENTS

| DE | 4422240 A1 | 1/1995 |
| DE | 19615990 C1 | 8/1997 |

(Continued)

OTHER PUBLICATIONS

International Search Report dated Mar. 3, 2016 for PCT/EP2015/079256.

(Continued)

*Primary Examiner* — Thomas Randazzo
(74) *Attorney, Agent, or Firm* — Bachman & LaPointe, P.C.

(57) ABSTRACT

Load-receiving device (1) for storing a cuboidal load (2) in a rack and for retrieving it therefrom, comprising two extendable telescopic arms (3, 4) which are spaced apart in parallel and on which there are arranged drivers (30, 40, 31, 41, 32, 42) situated opposite one another in pairs, which drivers can be pivoted into a swung-up position and into a position projecting at a right angle thereto, wherein the distance (d) between the telescopic arms (3, 4) is fixed or can be set in dependence on the width of the load. There is provision that each of the drivers (30, 40) situated opposite one another in pairs can be pivoted independently of the respective opposite driver, and/or that at least one of the drivers (30, 40) can be pivoted into at least one oblique intermediate position, that at least two mutually opposite edge detectors (300, 400, 302, 402) are arranged on the telescopic arms (3, 4) and are assigned to two mutually opposite drivers (30, 40, 32, 42), and that the drivers (30, 40)

(Continued)

can be pivoted independently of one another in dependence on the output signal from the edge detectors (300, 400, 302, 402).

10 Claims, 11 Drawing Sheets

(52) U.S. Cl.
CPC ............... *B65G 2203/0208* (2013.01); *B65G 2203/0233* (2013.01); *B65G 2207/08* (2013.01)

(56) References Cited

U.S. PATENT DOCUMENTS

| | | | | |
|---|---|---|---|---|
| 2011/0008138 A1* | 1/2011 | Yamashita | ........... | B65G 1/0435 414/277 |
| 2015/0203295 A1* | 7/2015 | Nakamura | ................ | B66F 9/07 414/274 |
| 2015/0217935 A1* | 8/2015 | Nakamura | ........... | B65G 1/0421 414/661 |
| 2015/0321845 A1* | 11/2015 | Nakamura | ........... | B65G 1/0421 414/273 |

FOREIGN PATENT DOCUMENTS

| | | |
|---|---|---|
| GB | 2280178 A | 1/1995 |
| JP | H109142617 A | 6/1997 |
| JP | 2012093278 A | 5/2012 |
| JP | 2012184085 A | 9/2012 |
| WO | 2011158422 A1 | 12/2011 |
| WO | 2014038370 A1 | 3/2014 |

OTHER PUBLICATIONS

Search Report dated Jan. 21, 2016 for Austrian Patent Application No. GM 80722015.

Search Report dated Jan. 21, 2016 for Austrian Patent Application No. GM 80732015.

English translation of International Preliminary Report on Patentability for PCT/EP2015/079256.

\* cited by examiner

LOAD-RECEIVING DEVICE

This invention relates to a load-receiving device for storing a cuboidal load in a rack and retrieving it therefrom, having two extendable telescopic arms, which are spaced apart in parallel and on which there are arranged drivers situated opposite one another in pairs, which drivers can be pivoted into a swung-up position, where they are substantially in parallel to the plane of the telescopic arms, and into a position projecting at a substantially right angle thereto, wherein the distance between the telescopic arms is fixed or can be set in dependence on the width of the load.

Load-receiving devices equipped with two parallel telescopic arms serve to quickly store loads in a high-rack storage and retrieve it therefrom. During the storage process, the drivers, which are situated opposite one another on the telescopic arms in the region ahead of the front edge of the load, are pivoted into a horizontal, aligned position, in which they can fulfill their driver function, and are then carried along by the extending telescopic arms, whereby the load is shifted into the storage shelf. Accordingly, on the other hand, during the retrieval process, the telescopic arms are extended into the storage shelf with the drivers being vertically swung-up, and then the drivers are pivoted into their horizontal, aligned position after having come to a halt in the region behind the rear edge of the load, whereupon the telescopic arms are retracted so that the load is carried along and is pulled into the load-receiving device.

This way of storing and retrieving loads has proven to be advantageous for medium-sized and large full-sided containers, whereas in smaller containers or containers having a patterned front or rear side, placement errors or imprecisions occur frequently, so that the actually stored position may differ quite strongly from the expected position of the load, which in turn may lead to malfunction during retrieval, as the load in the storage shelf is not found at its designated position or is found in a position rotated with respect to the latter. This occurs especially where the width of the load is approximately equal to or smaller than the length of one of the oppositely situated drivers or when the support area on the front or rear side of the load is insufficient or asymmetrical at the height of the horizontal position of the drivers, so that guidance by the drivers is uneven.

SUMMARY OF THE INVENTION

For this reason, it is an object of the invention to provide a load-receiving device of the before-mentioned kind, with which an accurately defined storage and retrieval motion can be achieved even for loads having a smaller or irregular surface.

It is another object of the invention to provide a load-receiving device allowing for the improvement of operational safety and error reduction.

Another object is to enable the identification and, optionally, the readjustment of containers that are in an oblique position or have been rotated, to avoid standstill of the plant.

According to the invention, this is achieved by the fact that the drivers are pivotable independently of one another and/or that at least one of the drivers is pivotable into at least one oblique position, which is situated between the swung-up position and the position projecting at a right angle, and at which the at least one driver is pivoted by a pivot angle $\alpha 1$, $\alpha 2$ from the swung-up position, wherein $\alpha 1$, $\alpha 2$ is larger than 0 and smaller than 90°, and that at least two mutually opposite edge detectors are arranged on the telescopic arms, which edge detectors are assigned to two mutually opposite drivers, and that the drivers are pivotable independently of one another depending on the output signal of the edge detectors.

When the load is of small width, this independent pivotability of the mutually opposite drivers enables one driver to be pivoted into a horizontal position to fulfill its driver function and the other driver to be left in its swung-up position, so that the drivers are no longer aligned and the telescopic arms can be moved closer towards each other.

Furthermore, for the drivers to fulfill their driver function, it is possible to always pivot the drivers into such a position that the drivers come into contact with the front or rear side of the load at a point that allows a stable translational displacement and thus prevents the driver from slipping off or the load to be rotated during displacement. For this reason, a control unit may be provided, which can access the dimensions of the load in a data base and calculate the most favorable pivot position of the drivers. Thus, according to a further refinement of the invention, the pivot angle $\alpha 1$, $\alpha 2$ of the drivers may be set depending on the dimensions of the load.

In turn, controlling the drivers in dependence on the output signal of the edge detectors enables the drivers, which are to be pivoted into their driver position, to be positioned very accurately in the region of the front edge or rear edge, and thus, when the telescopic arm starts moving, prevents no-load acceleration, which, on the one hand, unnecessarily prolongs the duration of displacement and may, on the other hand, cause deformation or damage to the load when it is hit by the approaching driver. Therefore, the multiple storage and retrieval processes also have the effect of preventing damage to the mechanical elements of the load-receiving device, which leads to a considerably longer lifetime of the individual components.

The smaller gap between the loads thus achieved results in a better use of space, an increased operational and failure safety and the reduction of errors. The dimensions of the rack shelf may be reduced due to the more accurate positioning.

Preferably, the detection of the edges is carried out by edge detectors independently of one another.

In order to accurately set the pivot position of the drivers, according to one embodiment of the invention the drivers may be mounted on pivot axes, each of which is coupled with a rotary actuator, which is controllable by a control device and by which the pivot angle $\alpha 1$, $\alpha 2$ can be set.

Using the rotary actuator, the set pivot angle is kept at a constant value, so that deviations from the target pivot angle are constantly sensed and corrected. In this way, using the rotary actuator not only enables the respective pivot angle to be reached be met with high accuracy and to be freely set from 0 to 90°, but in particular strongly reduces the time required to carry out the pivoting movement as compared to current stop solutions, whereby the total time required for storage and retrieval is strongly diminished.

One advantageous refinement of the invention may provide for the two mutually opposite edge detectors to be arranged at the end of the telescopic arms.

In this way, the drivers to be pivoted into their driver position may be positioned very accurately in the region of the front or rear edge.

One variant of the invention may provide that the mutually opposite edge detectors are formed by light-sensing devices whose range is approximately equal to the minimum distance between the telescopic arms to avoid that the detectors influence each other.

Furthermore, the invention relates to a rack operator unit having a load-receiving device according to the invention.

Furthermore, the invention relates to a shuttle having a load-receiving device according to the invention.

Furthermore, the invention relates to a method for controlling a load-receiving device.

A method for controlling a load-receiving device comprising telescopic arms and pivotable drivers for storing a cuboidal load in a rack and retrieving it therefrom may comprise the following steps:

sensing, during the extension movement of the telescopic arms, the two side walls of the load, which are situated substantially in parallel to the telescopic arms, to detect a front or a rear edge of the load, controlling the pivoting movement of the drivers in dependence on the location of the detected load edges.

Another such method may comprise the following steps:

sensing the two side walls of the load during the extension movement of the telescopic arms to detect a front or a rear edge of the load, and detecting an oblique position of the load, separately actuating the telescopic arms, which can be moved differently in relation to each other, to realign the load that has come into an oblique position.

BRIEF DESCRIPTION OF THE DRAWINGS

Below, the invention is detailed with reference to the embodiments depicted in the drawings. In these.

DETAILED DESCRIPTION

Figure 1:
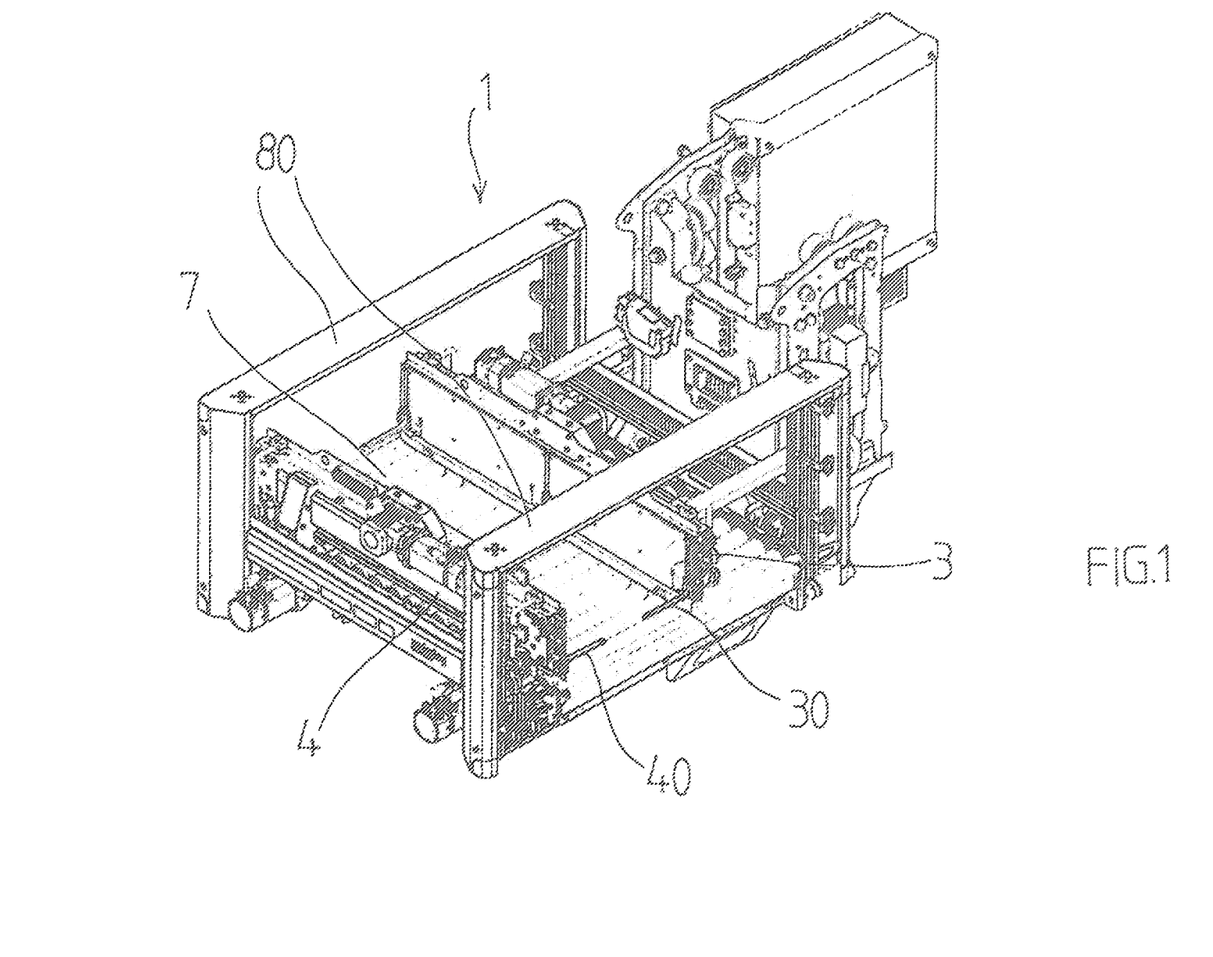
FIG. 1 shows an angled view of one embodiment of the load-receiving device according to the invention.
Figure 2:
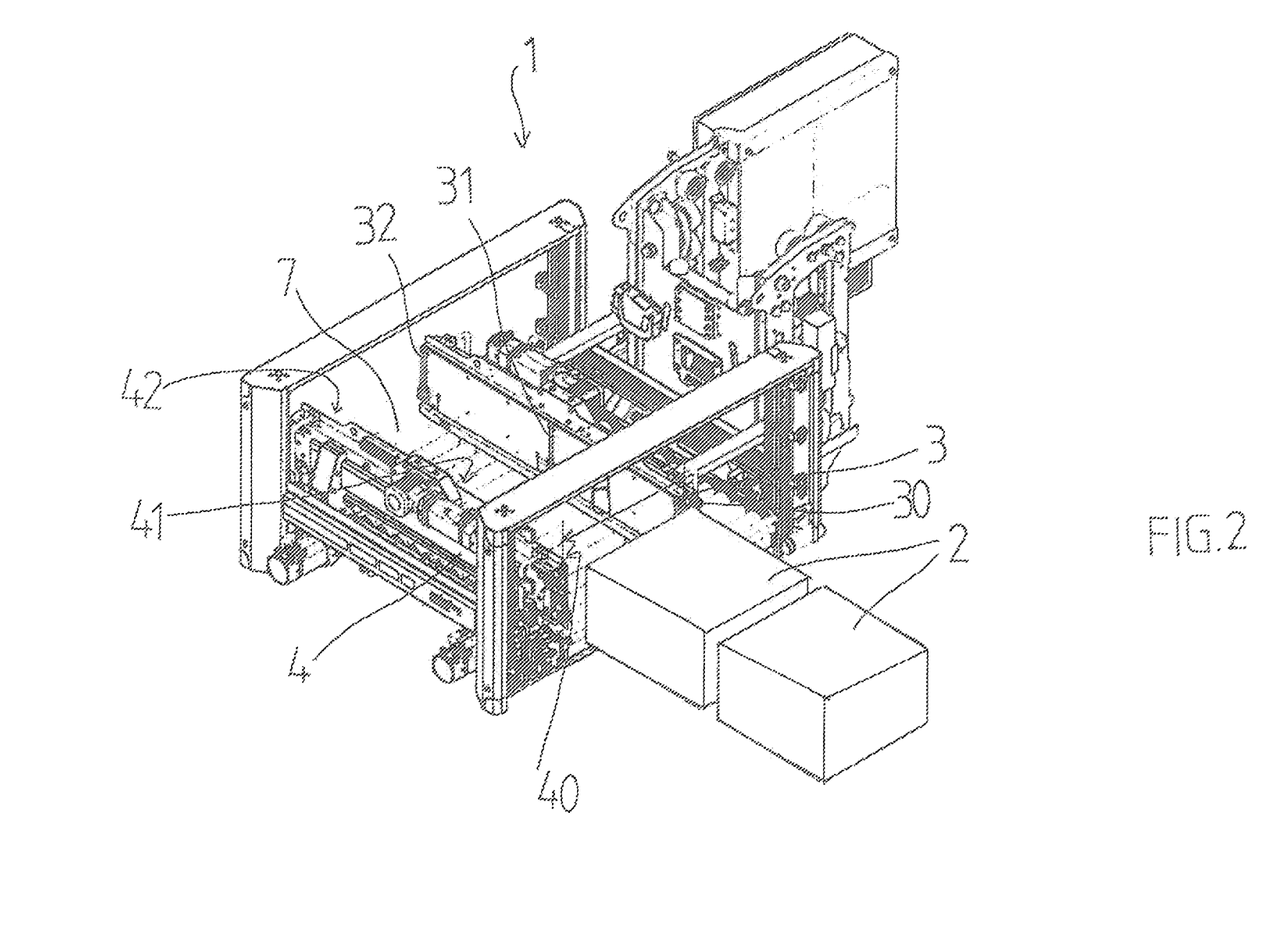
FIG. 2 shows an angled view of the load-receiving device of FIG. 1 with a load.
Figure 3:
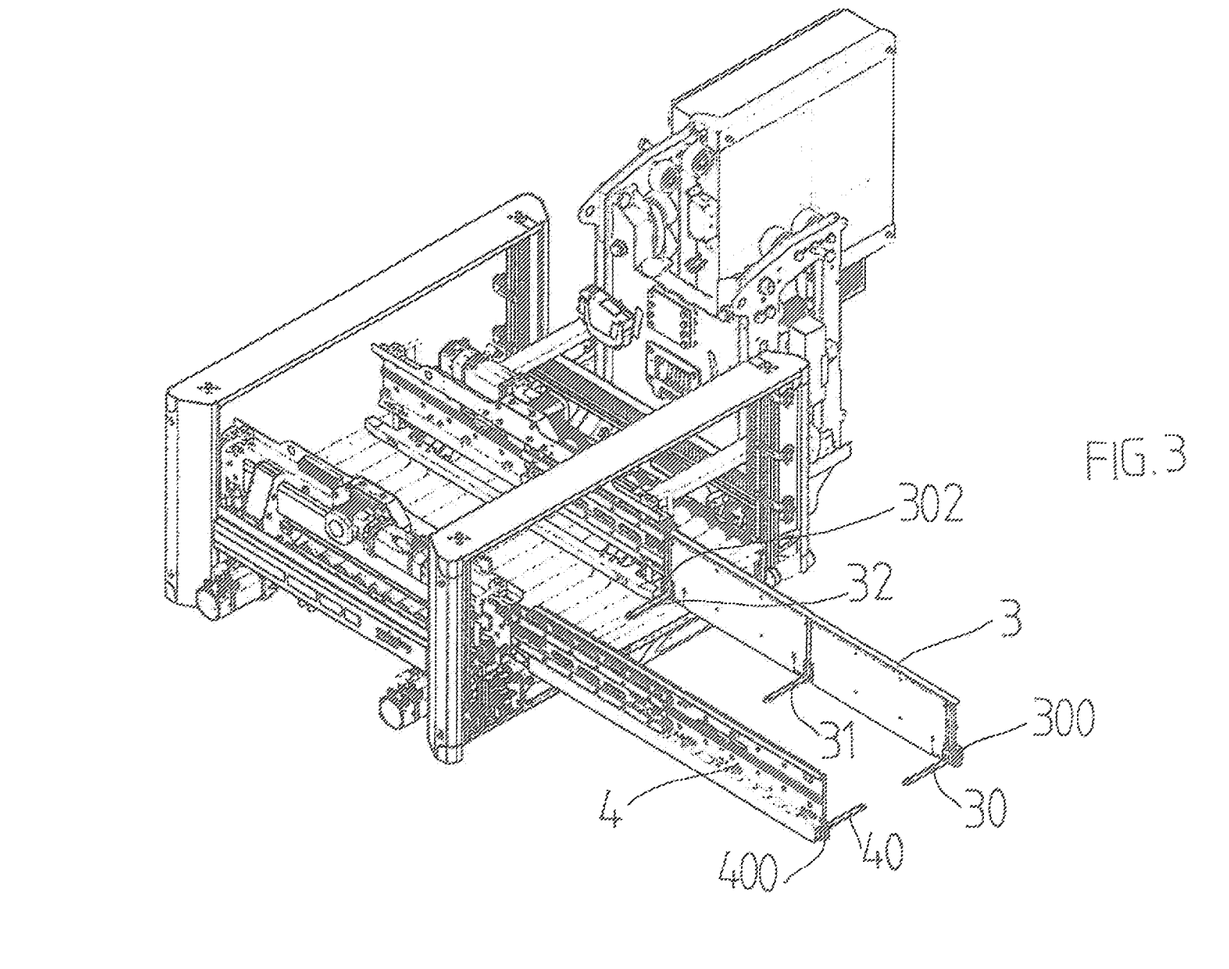
FIG. 3 shows an angled view of the load-receiving device of FIG. 1 with extended telescopic arms.
Figure 4:
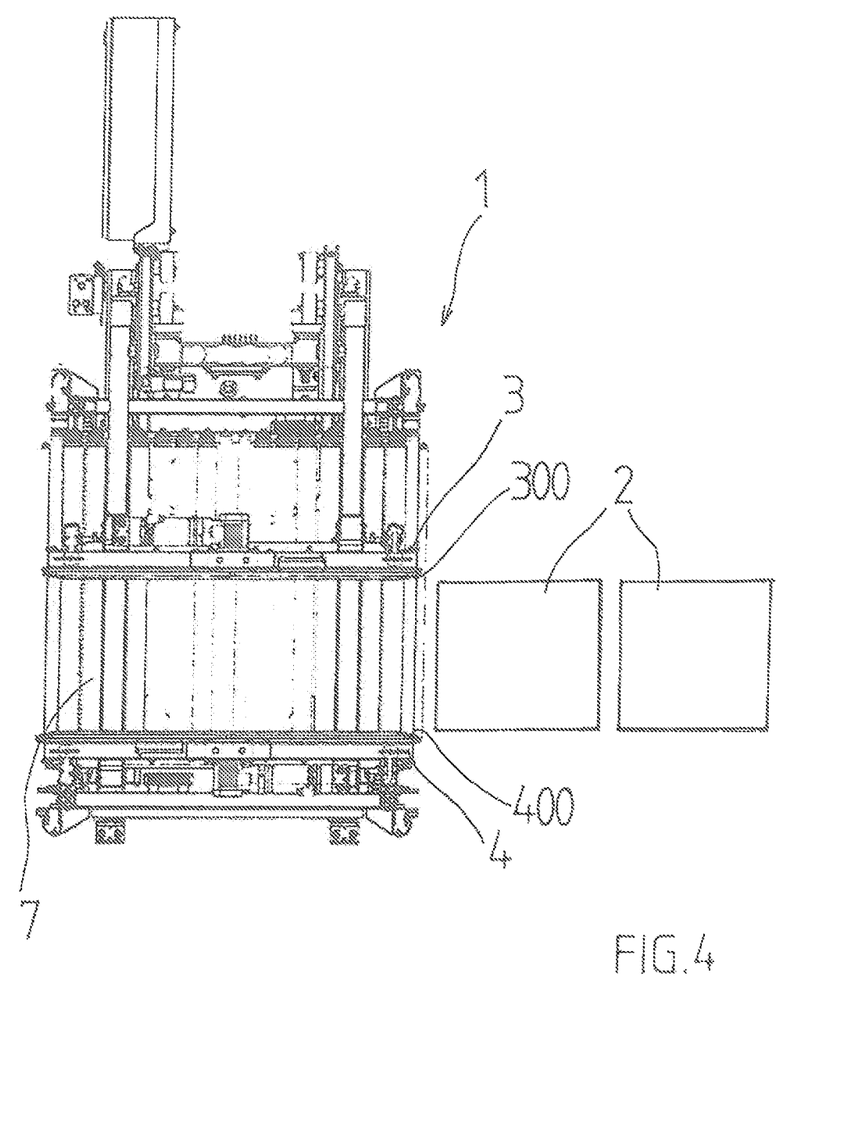
FIG. 4 to FIG. 8 each show a plan view of consecutive states of movement of the telescopic arms of the load-receiving device of FIG. 1.
Figure 5:
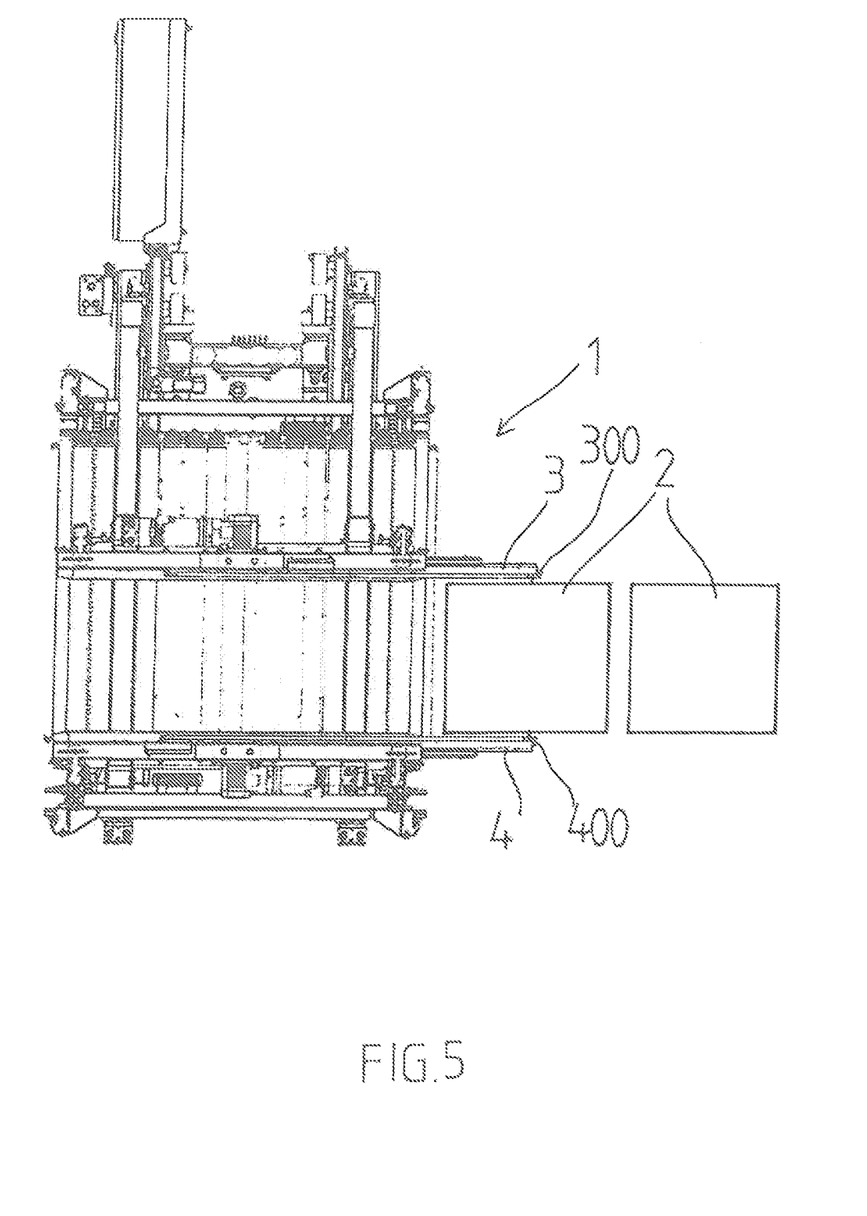
Figure 6:
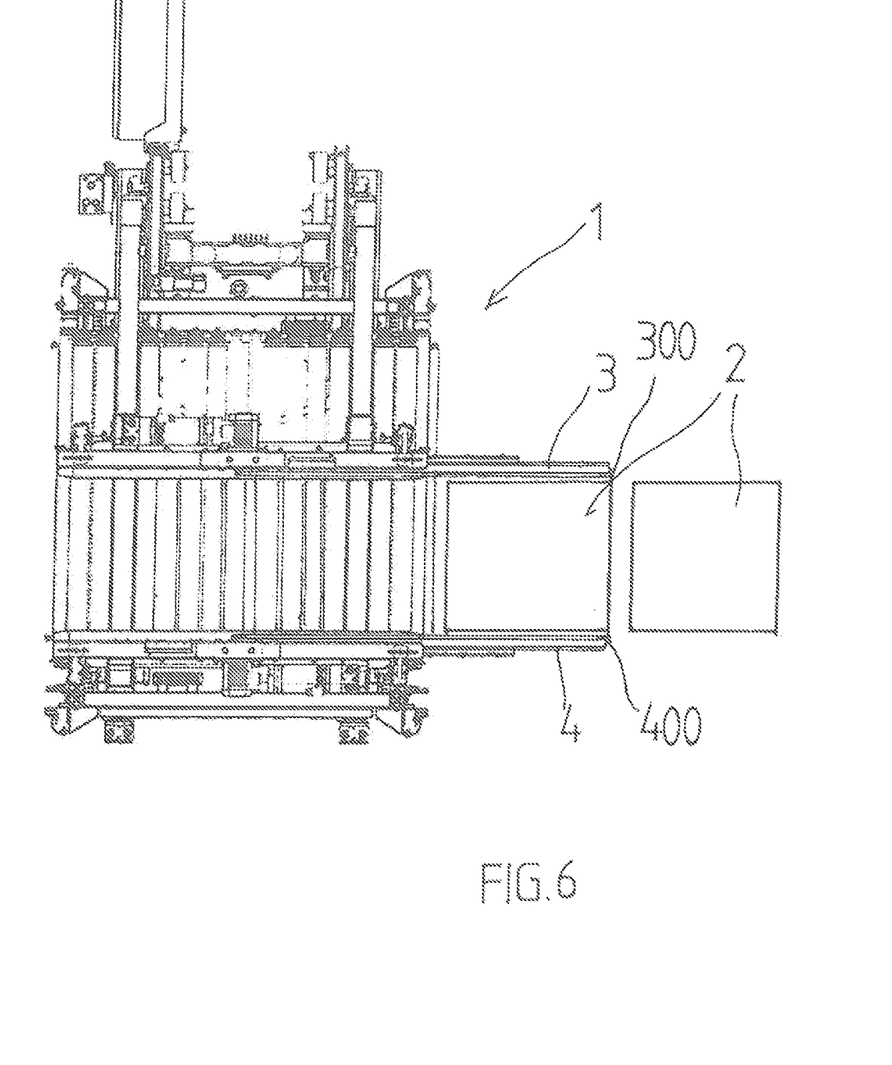
Figure 7:
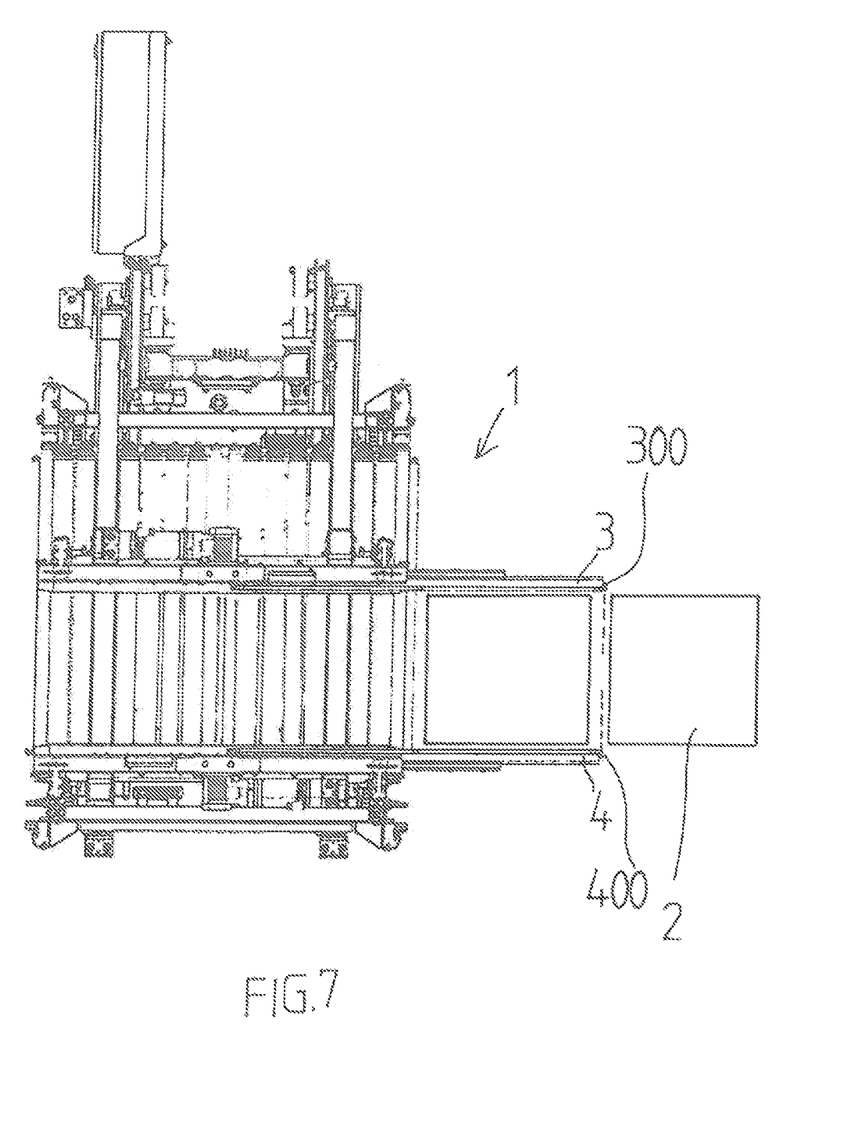
Figure 8:
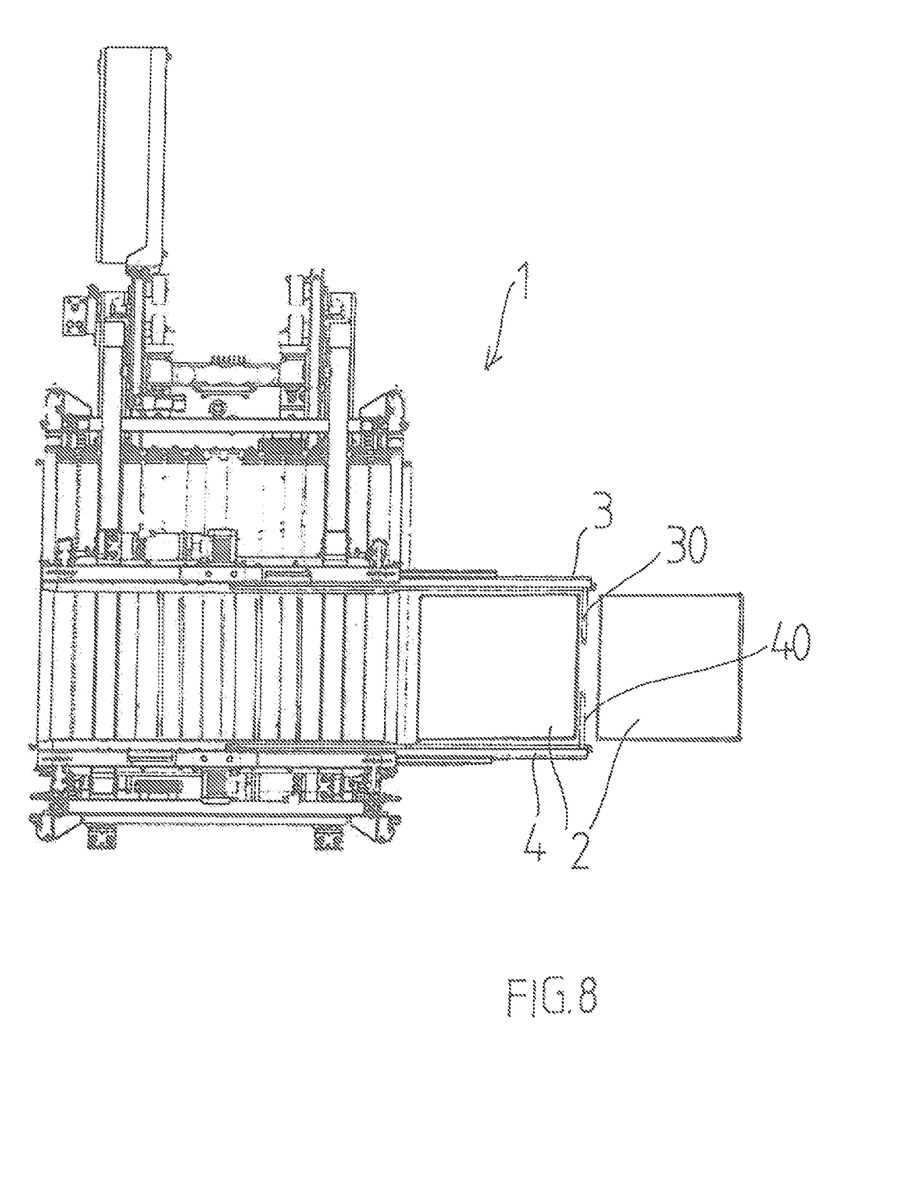

FIGS. 1 to 3 show a load-receiving device 1 for storing a cuboidal load 2, e.g. cardboard boxes, in a rack (not shown) and retrieving it therefrom, the device having two extendable telescopic arms 3, 4, which are spaced apart in parallel and arranged in a frame 80. The load-receiving device 1 may e.g. be part of a rack operator unit or a shuttle.

Rollers 7, which support the free-wheel movement of the load 2 but may also be driven to effect a movement of the load 2, are arranged on the lower side of the load-receiving device 1. The telescopic arms 3, 4 are shown in their retracted position In FIG. 1, 2 and in their extended position at the front side of the load-receiving device 1 in FIG. 3. In the exemplary embodiment shown, each telescopic arm 3, 4 is essentially extendable in two opposing directions, although FIG. 2 only shows the extended position at the front side for ease of illustration.

Figure 9:
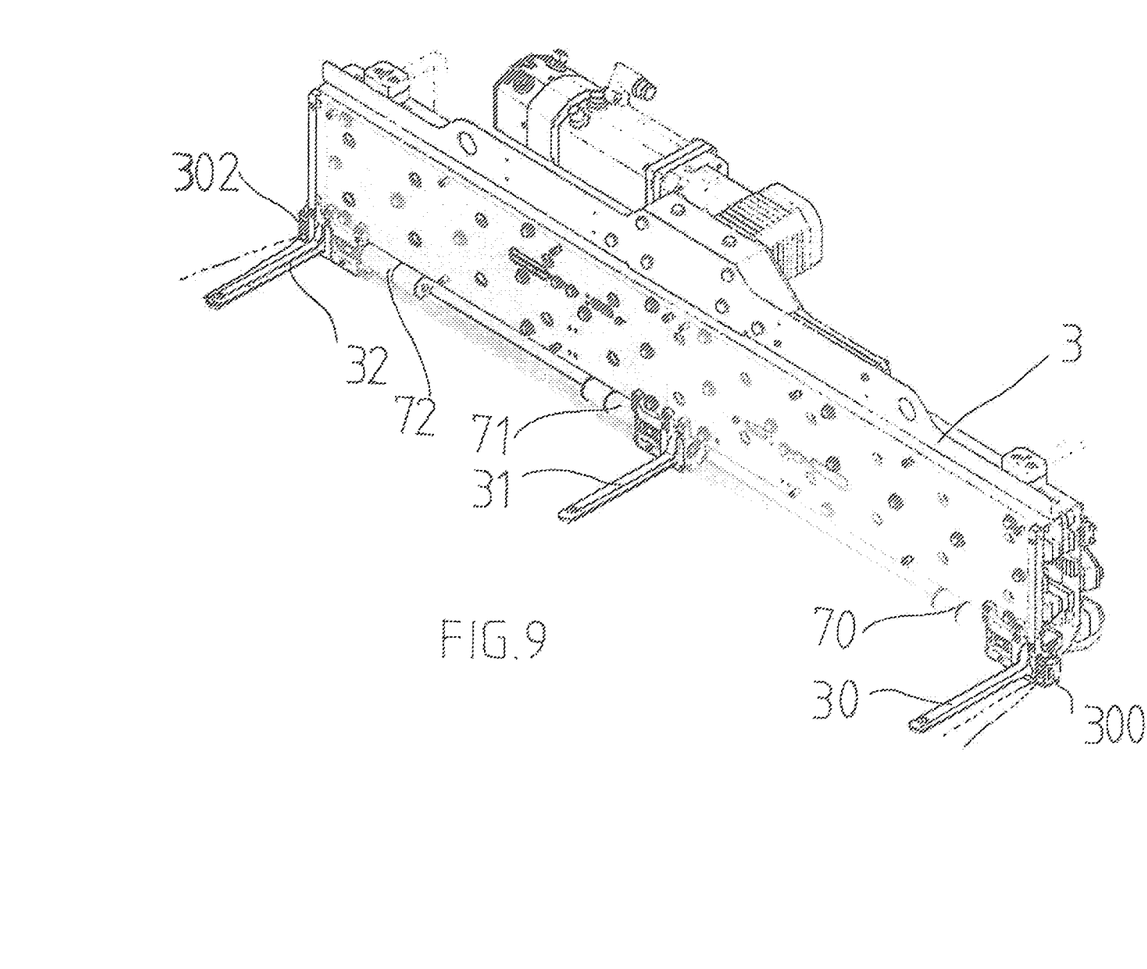
FIG. 9 shows an angled view of one of the telescopic arms of the load-receiving device of FIG. 1 and FIGS. 10 to 13 show front views with different positions of the mutually opposite drivers of the telescopic arms.

Drivers 30, 40; 31, 41 and 32, 42, which are situated opposite one another in pairs, are arranged on the telescopic arms 3, 4 and may be pivoted into a swung-up vertical position, which is substantially in parallel to the plane of the telescopic arms (FIG. 2), and into a horizontal position (FIG. 1, FIG. 3, FIG. 9) projecting substantially perpendicular thereto.

The distance d between the telescopic arms 3, 4 may be set in dependence on the width of the load. The distance d may also be fixed.

FIG. 4 to FIG. 8 show the chronological sequence of the extension and swinging movement during the retrieval of a load 2, herein two cardboard containers, from a rack shelf (not shown). The telescopic arms 3, 4, which are spaced apart in parallel, are extended (FIGS. 5, 6) from their retracted position in FIG. 4 until the drivers 30, 40 reach a position (FIG. 7) between the two cardboard containers 2, where they are pivoted from their swung-up into the projecting position. During this projecting position of the drivers 30, 40, which is illustrated in FIG. 10 in an enlarged view, the telescopic arms 3, 4 are again moved back into their retracted position and thereby move the anterior cardboard container 2 onto the load-receiving device 1, with which the cardboard container 2 can then be moved further.

Figure 10:
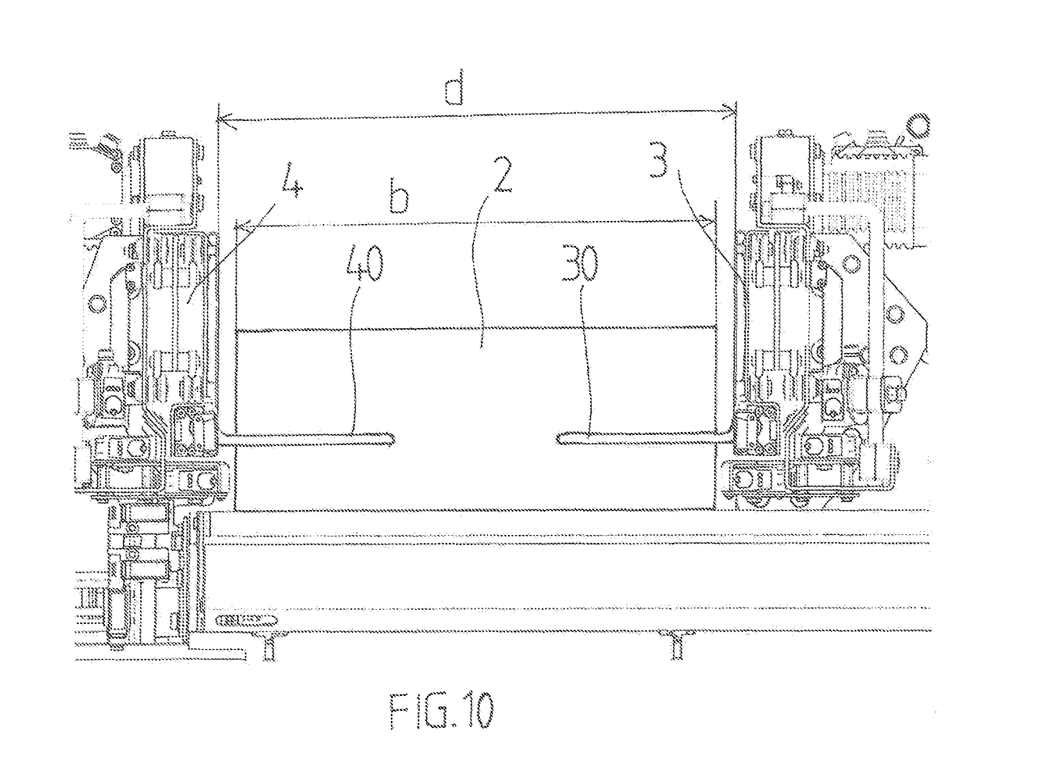

Moreover, FIG. 10 shows details of the bearing of the telescopic arms 3, 4, which consist of several parts and are not essential for the invention and not described further, as they may be embodied in various ways for the purposes of the invention.

As can be seen from FIG. 10, the distance d between the two telescopic arms 3, 4 is set such as to approximately correspond to the width b of the load, apart from an edge clearance, whereby almost the entire length of the drivers 30, 40 rests on the load, whereby a stable and rotation-proof movement of the load can be ensured.

For opposite projecting drivers 30, 40, the distance d between the telescopic arms 3, 4 cannot be set to a value smaller than approximately two times the length of the drivers, whereby proper guiding of the load 2 is not possible for loads of a width smaller than this minimum distance.

Figure 11:
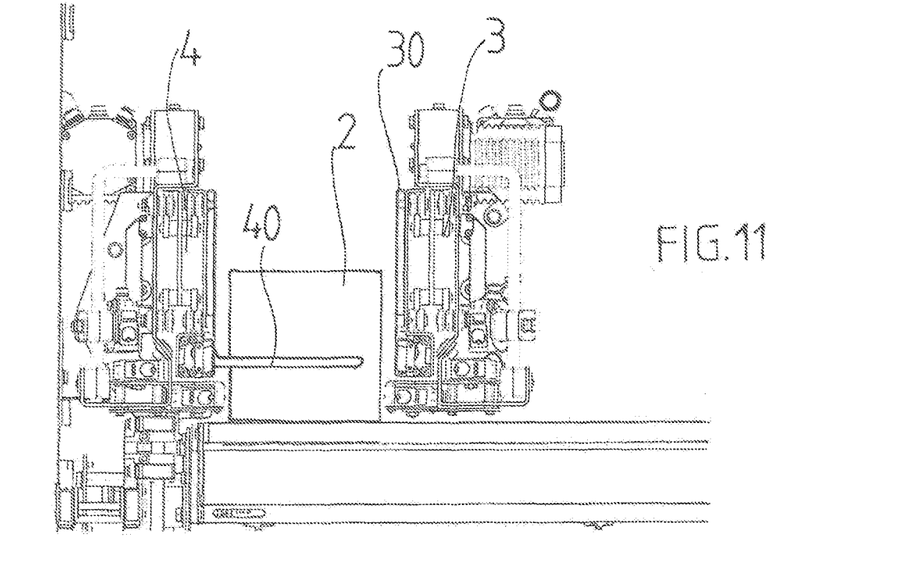

For this reason, according to the invention the mutually opposite drivers 30, 40; 31, 41 and 32, 42 are pivotable independently of one another, as depicted in FIG. 11.

For loads with a very small width, one driver 40 is pivoted into its horizontal, projecting position, while the other, opposite driver 30 is left in its swung-up position, e.g. as shown in FIG. 11. Thereby, the telescopic arms 3, 4 may be moved towards the load up to an edge clearance, and the guidance and movement may be effected by the driver 40 only.

The information on the width of the load 2 may be retrieved by the control unit from a table, from a higher-level system, e.g. a warehouse management system, or measured. Accordingly, the mutually opposite drivers 30, 40 may be actuated independently.

Furthermore, the invention provides that the drivers 30, 40 are pivotable into at least one oblique position between the swung-up position and the position projecting at a right angle, in which the drivers 30, 40 are pivoted by a pivot angle $\alpha_1$, $\alpha_2$, respectively, from the swung-up position, wherein $\alpha_1$, $\alpha_2$ is larger than 0 and smaller than 90°.

Figure 12:
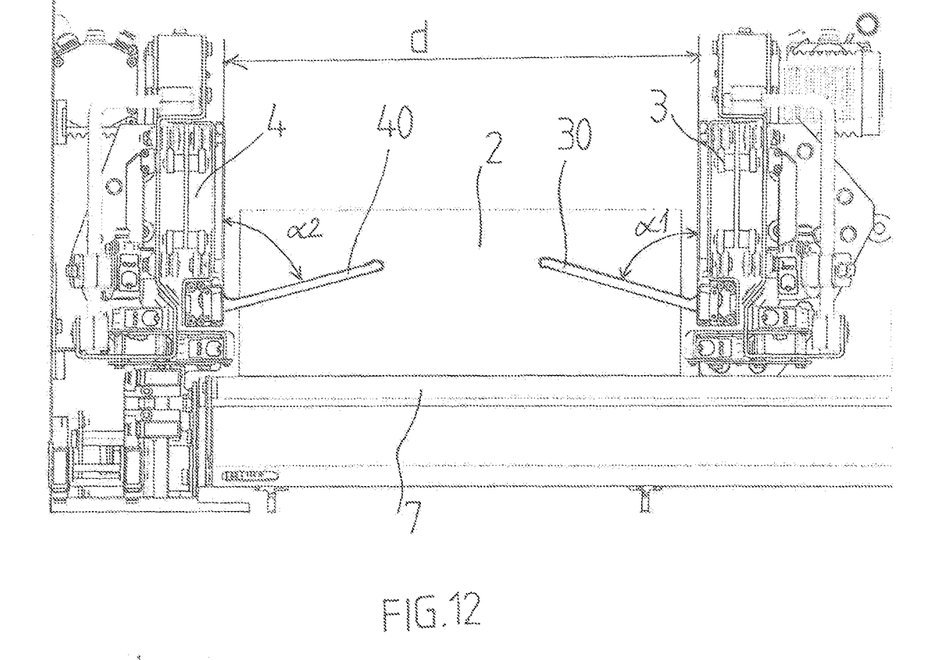

In FIG. 12, a position of the drivers 30, 40 has been selected, where $\alpha_1=\alpha_2$ is approximately equal to 75° and the drivers 30, 40 each adopt a same pivot angle, whereby they each rest on a point of the load that differs from the 90° position. The control unit can access the structural data of the load, which are stored in a table, from a higher-level system, e.g. a warehouse management system and obtain the corresponding target positions, or the load is measured on site and the pivot angle α1, α2 is set such as to enable a stable and rotation-proof movement of the load by the drivers 30, 40.

Figure 13:
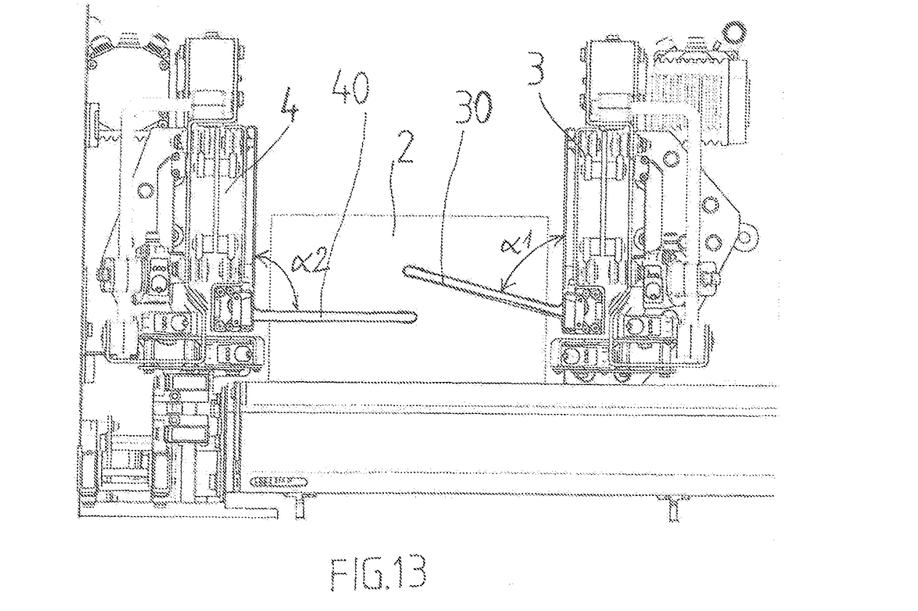

Another option for positioning the drivers 30, 40 is shown in FIG. 13, where the setting is α1=75° and α2=90°, so that the distance of the telescopic arms 3, 4 from each other may be set such as to be smaller than twice the length of the drivers 30, 40, and thus the telescopic arms 3, 4 may be placed very near to the load. Therefore, on the one hand the small width of the load can be accommodated, and on the other hand a favorable resting position of the drivers 30, 40 can be selected. Depending on the control unit and the actuator, the selection of angles α1, α2 may be performed continuously or at least in very small steps as desired.

As shown in FIG. 10, the drivers 30, 31, 32 and the mutually opposite drivers 40, 41, 42, which are not shown in this representation, are mounted on pivot axes, which are each coupled with a rotary actuator 70, 71, 72, which is controllable by a control device (not shown) and by which the pivot angle α1 or α2 can be set. The controllable rotary actuator 70, 71, 72 may be formed by, e.g., a brushless servo motor with an integrated motion control.

As already mentioned, the control unit may, e.g., set the pivot angle α1, α2 of the drivers 30, 40 in dependence on the dimensions of the load.

Two mutually opposite edge detectors 300, 400, which are assigned to two mutually opposite drivers, are arranged at the end of the telescopic arms 3, 4.

The drivers 30, 40 are pivotable depending on the output signal of the edge detectors 300 and independently of one another.

Depending on the use case, the mounting point of the mutually opposite drivers and edge detectors may vary. Thus, a further pair of drivers 31, 41 or even further pairs of drivers may be arranged between, preferably in the middle of (FIG. 3, 9), the pairs of drivers 30, 40 and 32, 42, which are arranged at opposing ends of the telescopic arms 3, 4. By the same token, further mutually opposite edge detectors, which may be used according to the invention to achieve a time-saving and load-protecting control of the drivers, may be assigned to these further pairs of drivers.

The mutually opposite edge detectors 300, 400 may be formed by light-sensing devices whose range is approximately equal to the minimum distance between the telescopic arms.

One method for storing a cuboidal load 2 in a rack and retrieving it therefrom consists of the following steps:

sensing, during the extension movement of the telescopic arms 3, 4, the two side walls of the loads, which are situated substantially in parallel to the telescopic arms 3, 4, to detect a front or rear edge of the load 2, controlling the pivot movement of the drivers 30, 40 in dependence of the location of the detected load edges.

Another method employing the load-receiving device according to the invention enables the realignment of containers that have come in an oblique position by performing the following steps:

sensing the two side walls of the load during the extension movement of the telescopic arms 3, 4 to detect a front or rear edge of the load 2, and detecting an oblique position of the load 2, separately actuating the telescopic arms 3, 4, which can be moved differently in relation to each other, to realign the load 2 that has come into an oblique position.

Detecting the oblique position of the load 2 is implemented by means of the signals of the mutually opposite edge detectors, which detect e.g. corner positions of the load that exhibit a certain displacement relative to one another, wherefrom the extent of the obliqueness or the rotated position of the load can be calculated. In a similar manner, the telescopic arms are extended to different extents to balance the oblique position of the load 2 during the extension or retraction movement, so that the load is realigned. Conventionally, such a storage position was no longer used and had to be corrected manually during a standstill of the plant.

What is claimed is:

1. A load-receiving device (1) for storing a cuboidal load (2) in a rack and retrieving the load therefrom, having two extendable telescopic arms (3, 4), which are spaced apart in parallel and on which there are arranged drivers (30, 40, 31, 41, 32, 42) situated opposite one another in pairs, which drivers are pivotable into a swung-up position, where the drivers are substantially in parallel to the plane of the telescopic arms, and into a projecting position in order to engage with the load (2) and to move the load, wherein the distance (d) between the telescopic arms (3, 4) is set in dependence on the width of the load, characterized in that:

each of the drivers (30, 40) situated opposite one another in pairs is pivotable independently of the respective opposite driver, and/or at least one of the drivers (30, 40) is pivotable into at least one oblique position, which is situated between the swung-up position and the position projecting at a right angle, and at which the at least one driver (30, 40) is pivoted by a pivot angle α1, α2 from the swung-up position, wherein α1, α2 is larger than 0 and smaller than 90° and wherein for at least one pair of the drivers, the angle α1 of a first driver (30) in the pair is settable to be different to the angle α2 of the second driver (40) in the pair, whereby each of the first driver and the second driver rests on a point of the load that differs from the 90° position and the respective pivot angle α1, α2 is set such as to enable a stable and rotation-proof movement of the load by the first driver and second driver, and at least two mutually opposite edge detectors (300, 400, 302, 402) are arranged on the telescopic arms (3, 4), which edge detectors are assigned to two mutually opposite drivers (30, 40, 32, 42), and the first driver and the second driver are pivotable independently of one another depending on the output signal of the edge detectors (300, 400, 302, 402).

2. The load-receiving device according to claim 1, characterized in that the two telescopic arms are each provided with their own drive, so as to permit the telescopic arms to be actuated independently of one another and be moved differently in relation to each other.

3. The load-receiving device according to claim 1, characterized in that the drivers (30, 40) are mounted on pivot axes, each of which is coupled with a rotary actuator (70, 71, 72), which is controllable by a control device and by which rotary actuator the pivot angle α1, α2 is settable.

4. The load-receiving device according to claim 3, characterized in that the pivot angle α1 of the drivers (30, 40) is settable in dependence on the dimensions of the load.

5. The load-receiving device according to claim 1, characterized in that the two mutually opposite edge detectors (300, 400) are arranged at the ends of the telescopic arms (3, 4).

6. The load-receiving device according to claim 5, characterized in that the two mutually opposite edge detectors (300, 400) are formed by light-sensing devices whose range is approximately equal to the minimum distance between the telescopic arms.

7. A rack operator unit having a load-receiving device according to claim 1.

8. A shuttle having a load-receiving device according to claim 1.

9. A method for controlling a load-receiving device comprising telescopic arms and pivotable drivers for storing a cuboidal load (2) in a rack and retrieving the load therefrom, characterized by:
   sensing, during the extension movement of the telescopic arms (3, 4), the two side walls of the load, which are situated substantially in parallel to the telescopic arms, to detect a front or a rear edge of the load,
   controlling the pivoting movement of the drivers (30, 40) in dependence on the location of the detected load edges.

10. A method for controlling a load-receiving device comprising telescopic arms and pivotable drivers for storing a cuboidal load (2) in a rack and retrieving the load therefrom, characterized by:
    sensing the two side walls of the load during the extension movement of the telescopic arms (3, 4) to detect a front or rear edge of the load, and detecting an oblique position of the load (2),
    separately actuating the telescopic arms (3, 4), so as to be moved differently in relation to each other, to realign the load (2) that has come into an oblique position.

* * * * *